US008396976B2

(12) United States Patent
Chandrasekaran et al.

(10) Patent No.: US 8,396,976 B2
(45) Date of Patent: Mar. 12, 2013

(54) ADMITTING CALLS BASED ON ENDPOINT LOCATIONS

(75) Inventors: Subramanian Chandrasekaran, Redmond, WA (US); Neil A. Deason, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 146 days.

(21) Appl. No.: 12/872,709

(22) Filed: Aug. 31, 2010

(65) Prior Publication Data

US 2012/0054356 A1 Mar. 1, 2012

(51) Int. Cl.
*G06F 15/16* (2006.01)
(52) U.S. Cl. ......................................................... 709/229
(58) Field of Classification Search .................... None
See application file for complete search history.

(56) References Cited

U.S. PATENT DOCUMENTS

| | | | |
|---|---|---|---|
| 6,977,938 B2 * | 12/2005 | Alriksson et al. | 370/401 |
| 7,369,567 B2 | 5/2008 | Newberg | |
| 7,499,415 B2 | 3/2009 | Dhesikan | |
| 2003/0009594 A1 * | 1/2003 | McElligott | 709/245 |
| 2006/0045132 A1 * | 3/2006 | Metke | 370/477 |
| 2007/0207818 A1 | 9/2007 | Rosenberg | |
| 2009/0003324 A1 | 1/2009 | Zhao | |
| 2009/0207757 A1 | 8/2009 | Andreasen | |
| 2010/0088425 A1 | 4/2010 | Hooda | |

OTHER PUBLICATIONS

Smith, Anne, et al., "An Overview of Cisco IP Communications", Dec. 9, 2005, Cisco Press, 3 pages.
Cisco, "Call Survivability in Distributed Deployments" Cisco Customer Voice Portal (CVP) Release 3.1 Solution Reference Network Design (SRND), Nov. 2005, 5 pages.
Cisco, "RSVP Precondition: Improve QoS in the VoIP Network", Feb. 2009, 9 pages.
Cisco, "Device Mobility", Apr. 2010, 14 pages.

* cited by examiner

*Primary Examiner* — Scott Christensen
(74) *Attorney, Agent, or Firm* — Workman Nydegger

(57) ABSTRACT

The present invention extends to methods, systems, and computer program products for admitting calls based on endpoint locations. Embodiments of the invention can be used to map (e.g., IP) subnets of an enterprise to the location where the subnets are managed in the network. A call admission control decision is then based on the subnets where endpoints (e.g., IP nodes) are currently located (as opposed to where users that use the endpoints are homed at). Embodiments of the invention can use just in time location detection. That is, endpoint locations can be detected just before a bandwidth policy decision is made. Detecting locations just before a bandwidth policy decision increases the likelihood of making an appropriate bandwidth policy decision.

19 Claims, 2 Drawing Sheets

ADMITTING CALLS BASED ON ENDPOINT LOCATIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

On some networks, various policy decisions are made prior to permitting a (e.g., audio and/or video) session on a network. For example, checks can be made to insure that sufficient bandwidth is available for a requested session and that admission of a requested session is unlikely to cause degradation of other existing sessions. Policy decisions with respect to session admission are typically made based on pre-defined locations for computer systems that will participate in the session.

For example, a laptop computer system may be assigned to an employee whose office is at a first office location (e.g., in one city, state, county, etc). A corporate server used by the employee may be at a second office location (e.g., in another city, state, county, etc). Policy data can map the laptop computer system to the first office location and the corporate server to the second office location and can also indicate the bandwidth available on links between the first and second office locations. Session admission control for sessions between the laptop computer system and the server can be based on the policy data. Accordingly, sessions between the laptop computer system and corporate server can be controlled so as to regulate bandwidth usage on links between the first and second off locations.

Generally, a laptop computer system is a mobile device can be used at (or roam between) different locations. However, since the laptop computer system is mapped to the first office location, it can be difficult (and perhaps not possible) to make appropriate session admission control decisions when the laptop computer system is used at other locations. For example, if the laptop computer system is used form a third different location, such as, for example, a hotel (e.g., in a further city, state, country, etc.), a policy server may have no way to know the laptop has been moved. Further, even if the policy server is somehow made aware of the third location, the policy server may have no way to obtain policy data for the links between the second and third locations.

Thus, the policy server may make a policy decision based on the policy data it is aware of (i.e., policy data for the first office location) or may choose to make no decision at all. In either case, a session to the corporate server may be denied even if bandwidth between the first and third location is sufficient for admitting the session. Alternately, a session to the corporate server may be permitted even if available bandwidth between the first and third location is insufficient for admitting the session.

These difficulties can compounded when a session is to be established between a pair of mobile devices, both of which are roaming.

BRIEF SUMMARY

The present invention extends to methods, systems, and computer program products for admitting calls based on endpoint locations. An admission control component receives a session admission request for a decision whether to admit a media session that has been requested between a first computer system and a second computer system. The session admission request includes a first pair of electronic addresses, a second pair of electronic addresses, a specified media type for the media session, and bandwidth requirements for the media session. The first pair of electronic addresses includes a host electronic address for the first computer system and a public electronic address for the first computer system. The second pair of electronic addresses includes a host electronic address for the second computer system and a public electronic address for the second computer system. Public electronic addresses can be routable from anywhere on the Internet.

The admission control component derives a first (e.g., geographic) location from the first pair of electronic addresses. The first location is the location of the first computer system. The admission control component derives a second (e.g., geographic) location from the second pair of electronic addresses. The second location is the location of the second computer system.

The admission control component accesses a list of identified links between the first location and the second location. Each link in the list of links has an available bandwidth for media sessions of the specified media type. The admission control component determines if there is sufficient bandwidth available between the first and second locations by comparing the bandwidth requirements for the requested media session to the available bandwidth for each identified link. The admission control component decides whether or not to admit the media session based on the determination.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
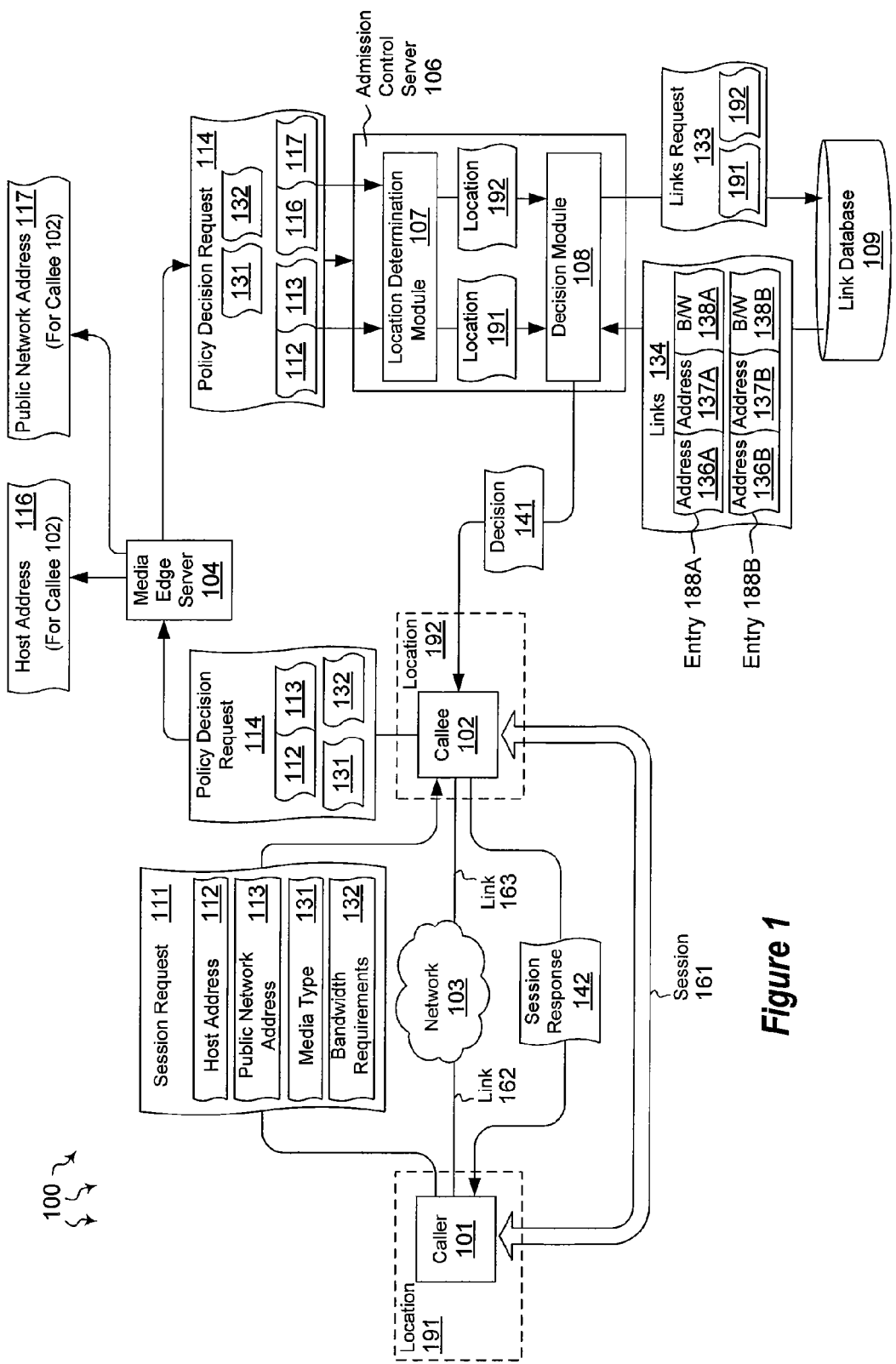
FIG. 1 illustrates an example computer architecture that facilitates admitting calls based on endpoint locations.

The present invention extends to methods, systems, and computer program products for admitting calls based on endpoint locations. An admission control component receives a session admission request for a decision whether to admit a media session that has been requested between a first computer system and a second computer system. The session admission request includes a first pair of electronic addresses, a second pair of electronic addresses, a specified media type for the media session, and bandwidth requirements for the media session. The first pair of electronic addresses includes a host electronic address for the first computer system and a public network electronic address for the first computer system. The second pair of electronic addresses includes a host electronic address for the second computer system and a public network electronic address for the second computer system. Public network electronic addresses can be routable from anywhere on the Internet.

The admission control component derives a first (e.g., geographic) location from the first pair of electronic addresses. The first location is the location of the first computer system. The admission control component derives a second (e.g., geographic) location from the second pair of electronic addresses. The second location is the location of the second computer system.

The admission control component accesses a list of identified links between the first location and the second location. Each link in the list of links has an available bandwidth for media sessions of the specified media type. The admission control component determines if there is sufficient bandwidth available between the first and second locations by comparing the bandwidth requirements for the requested media session to the available bandwidth for each identified link. The admission control component decides whether or not to admit the media session based on the determination.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile (e.g., Internet Protocol ("IP")) telephones, PDAs, pagers, routers, switches, other IP nodes, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates admitting calls based on endpoint locations. Referring to FIG. 1, computer architecture 100 includes caller 101, caller 102, media edge server 104, admission control server 106, and link data base 109. As depicted, caller 101 and callee 102 are connected to network 103 via links 162 and 163 respectively. Network 103 can be an enterprise Wide Area Network ("WAN"). Communication from caller 101 to callee 102 can travel across link 162 to network 103, across one or more links within network 103 to link 163, and across link 163 to callee 102. Likewise, communication from callee 102 to caller 101 can travel across link 163 to network 103, across one or more (of the same and/or different) links within network 103 to link 162, and across link 162 to caller 101.

As depicted, caller 101 is located at location 191 and caller 102 is located at location 192. Locations 191 and 192 can be different physical and/or geographic locations, such as, for example, one or more of: different buildings, different cities, different counties, different states, difference provinces, different countries, different continents, etc. For example, caller 101 may be in Los Angeles, Calif., USA and callee 102 may be in Tokyo, Japan.

Callee 102, media edge server 104, admission control server 106, and link database 109 can be connected to one another over (or be part of) a further network, such as, for example, a Local Area Network ("LAN").

Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Caller 101 and callee 102 can be computing systems, such as, for example, IP phones or other IP nodes. Caller 101 and callee 102 can include mechanisms to signal one another to request establishment of a media session between caller 101 and callee 102. Once established a media session can be used to exchange media data, such as, for example, audio data on a telephone call, between caller 101 and callee 102.

Media edge server 104 can be a boundary device between the enterprise WAN and the Internet. Media edge server 104 is responsible for relaying media to the Internet as well as receiving media from the Internet.

As depicted, admission control server 106 includes location determination module 107 and decisions module 108. Generally, admission control server 106 is configured to decide whether or not requested sessions, for example, between caller 101 and callee 102, can be admitted. Location determination module 107 is configured to derive a physical and/or geographic location for a computer system based on one or more electronic (e.g., IP) address for the computer system. In some embodiments, location determination module 107 determines a (e.g., IP) subnet for a computer system from a host electronic (e.g., IP) address for the computer system and an Internet routable electronic (e.g., IP) address for the computer system. From the subnet, location determination module 107 then derives a physical and/or geographic location for the computer system.

Decision module 108 is configured to determine if there is sufficient bandwidth for a session and decide whether or not to admit a session. Based on an originating location and a destination location for a requested session, decision module 108 can access a list of links between the originating location and the destination location. Each link can be associated with link information that indicates an amount of available bandwidth (possibly per media type) on the link. Decision module 108 can compare the bandwidth requirements for a requested session to the available bandwidth for each link. If each link has sufficient available bandwidth to satisfy the bandwidth requirements, decision module 108 can indicate that the session is to be admitted. On the other hand, if one or links have insufficient available bandwidth to satisfy the bandwidth requirements, decision module 108 can indicate that the session is not to be admitted.

In some embodiments, decisions module 108 internal maintains link data for links between various different geographic locations. In other embodiments, decision module 108 can refer to links database 109. Links database 109 can maintain link data for a links between various different geographic locations. The link data can include entries that define links (e.g., between electronic (e.g., IP) addresses and/or physical/geographic locations) and their corresponding available bandwidth. In some embodiments, available bandwidth is maintained per modality (media type), such as, for example, audio data, video data, etc. For example, for each modality, links database 109 can maintain the static link bandwidth capacity that is configured and the real time bandwidth utilization. Accordingly, available bandwidth can be computed (available bandwidth=bandwidth capacity−bandwidth utilization).

Figure 2:
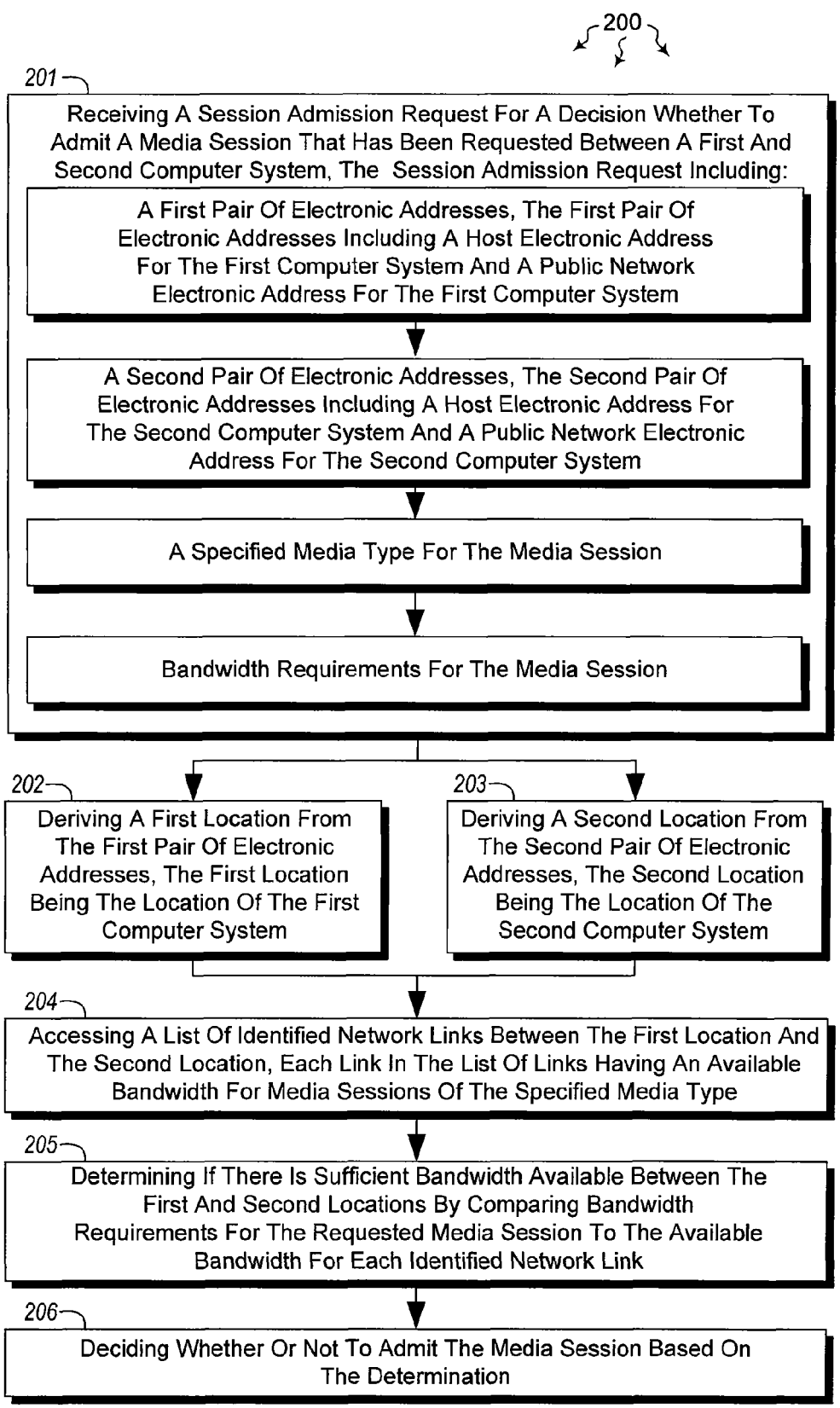
FIG. 2 illustrates a flow chart of an example method for admitting calls based on endpoint locations.

FIG. 2 illustrates a flow chart of an example method 200 for admitting calls based on endpoint locations. Method 200 will be described with respect to the components and data of computer architecture 100.

As depicted, caller 101 can send session request 111 to callee 102. Caller 101 can use signaling (e.g., call establishment) mechanisms to direct session request 111 to callee 102. Callee 102 can receive session request from caller 101. Session request includes host address 112, public network address 113, media type 131, and bandwidth requirements 132. Host address 112 indicates a host electronic (e.g., IP) address for caller 101. Public network address 113 indicates an Internet routable electronic (e.g., IP) address for caller 101. Media type 131 indicates the type of media that is to be transferred over the requested session. Bandwidth requirements 132 indicate how much bandwidth the session anticipates using.

Upon, receiving session request 111, callee 102 reformulates session request 111 into policy decision request 114, which also includes host address 112, public network address 113, media type 131, and bandwidth requirements 132. Callee 102 sends policy decision request 114 to media edge server 104. Media edge server 104 receives policy decision request from callee 102. Media edge server 104 determines host address 116 and public network address 117 for callee 102. Host address 116 indicates a host electronic (e.g., IP) address for callee 102. Network address 117 indicates an Internet routable electronic (e.g., IP) address for callee 102.

Media edge server 104 adds host address 116 and public network address 117 to policy decision request 114. Media edge server 104 sends policy decision request 114 to admission control server 106.

Method 200 includes an act of receiving a session admission request for a decision whether to admit a media session that has been requested between the first computer system and the second computer systems, the session admission request including: a first pair of electronic addresses, the first pair of electronic addresses including a host electronic address for the first computer system and a public network electronic address for the first computer system, a second pair of electronic addresses, the second pair of electronic addresses including a host electronic address for the second computer system and a public network electronic address for the second computer system, a specified media type for the media session, and bandwidth requirements for the media session, public network addresses can be routable on the Internet (act 201). For example, admission control server 106 can receive policy decision request 114 from media edge server 104. As depicted, policy decision request 114 includes host address 112 and network address 113, host address 116 and network address 117, media type 131, and bandwidth requirements 132. Upon receiving policy decisions request 114, host address 112 and public network address 113 and host address 116 and public network address 117 are directed to location determination module 107.

Method 200 includes an act of deriving a first location from the first pair of electronic addresses, the first location being the location of the first computer system (act 202). For example, location determination module 107 can derive location 191 from host address 112 and network address 113. In some embodiments, location determination module 107 uses host address 112 and network address 113 to determine a (e.g., IP) subnet corresponding to caller 101. Location determination module 107 then uses the subnet to derive location 191.

Method 200 includes an act of deriving a second location from the second pair of electronic addresses, the second location being the location of the second computer system (act 203). For example, location determination module 107 can derive location 192 from host address 116 and network address 117. In some embodiments, location determination module 107 uses host address 116 and network address 117 to determine a (e.g., IP) subnet corresponding callee 102. Location determination module 107 then uses the subnet to derive location 192. Location determination module 107 sends locations 191 and 192 to decision module 108. Decision module 108 receives locations 191 and 192 from location determination module 107.

Method 200 includes an act of accessing a list of identified links between the first location and the second location, each link in the list of links having an available bandwidth for media sessions of the specified media type (act 204). For example, decision module 108 can access a list of links between locations 191 and 192. Each link can indicate an available bandwidth for messages of media type 131 (e.g., audio data and/or video data).

In some embodiments, decision module 108 sends link request 133, including locations 191 and 192, to link database 109. In response, to link request 133, link database returns links 134 to decision module 108. Links 134 includes a list of links, for example, between electronic (e.g., IP) addresses or locations, between location 191 and location 192. Links 134 can include a number of entries that indicate endpoints for a link and the available bandwidth on the link. For example, entry 188A indicates that bandwidth 138A is available between address 136A and address 137A. Similarly, entry 188B indicates that bandwidth 138B is available between address 136B and address 137. Other entries can also be included for other links that are to be traversed between location 191 and location 192.

Method 200 includes an act of determining if there is sufficient bandwidth available between the first and second locations by comparing the bandwidth requirements for the requested media session to the available bandwidth for each identified link (act 205). For example, decision module 108 can determine if there is sufficient bandwidth available between caller 101 and callee 102 by comparing bandwidth requirements 132 to available bandwidth 138A, 138B, etc., If each of available bandwidths 138A, 138B, etc., are sufficient to satisfy bandwidth requirements 132, decision module 108 determines that there is sufficient bandwidth available for a session between caller 101 and callee 102. On the other hand, if one or more available bandwidths 138A, 138B, etc., are insufficient to satisfy bandwidth requirements 132, decision module 108 determines that there is insufficient bandwidth available for a session between caller 101 and callee 102.

Method 200 includes an act of deciding whether or not to admit the media session based on the determination (act 206). For example, decision module 108 can generate decision 141 indicating whether or not to admit a session between caller 101 and callee 102 based whether there is sufficient or insufficient available bandwidth. Decision module 108 can send decision 141 to callee 102. If there is sufficient available bandwidth, decision 141 can indicate that a session is to be admitted. On the other hand, if there is insufficient available bandwidth to satisfy the bandwidth requirements, decision 141 can indicate that the session is not to be admitted.

Upon receiving decision 141, callee 102 can generate session response 142, indicative of decision 141. Callee 102 can send session response 142 to caller 101. Caller 101 can receive session response 142 from callee 102. If session response 142 indicates that a session can be admitted (e.g., an "OK"), session 161 is established between caller 101 and 102. On the other hand, if session response 142 indicates that a session is not to be admitted, no session is established.

Once established, media of the specified media type (e.g., audio and/or video data) can be exchanged between caller 101 and callee 102 over session 161.

Accordingly, embodiments of the invention can be used to map (e.g., IP) subnets of an enterprise to the location where the subnets are managed in the network. A call admission control decision is then based on the subnets where endpoints (e.g., IP nodes) are currently located (as opposed to where users that use the endpoints are homed at). Embodiments of the invention can use just in time location detection. That is, endpoint locations can be detected just before a bandwidth policy decision is made. Detecting locations just before a bandwidth policy decision increases the likelihood of making an appropriate bandwidth policy decision.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a call admission control server including one or more processors and system memory, the call admission control server residing in a common site with one or more computer systems, including a first computer system, the computer system connected to a further one or more other computer systems, including a second computer system, via a wide area network, a method for making a call admission control policy decision for an establishment of a media session requested between the first computer system and the second computer system for a specified media type, the method comprising:

receiving, at the call admission control server, from the first computer system a policy decision request, wherein the policy decision request was sent by the first computer system in response to the first computer system receiving a session admission request from the second computer system, wherein the session admission request comprises a first pair of electronic addresses including a host electronic address for the first computer system and a public network electronic address for the first computer system wherein the public network electronic address for the first computer system is routable from anywhere on the Internet, a specified media type for the media session, and bandwidth requirements for the media session, and wherein the policy decision request is a reformulated version of the session admission request, reformulated to also include a second pair of electronic addresses, the second pair of electronic addresses including a host electronic address for the second computer system and a public network electronic address for the second computer system, the public electronic address for the second computer system routable from anywhere on the Internet;

determining, at the call admission control server, a network subnet for the first computer system from the first pair of electronic addresses corresponding to the first computer system;

determining, at the call admission control server, a network subnet for the second computer system from the second pair of electronic addresses corresponding to the second computer system;

deriving, at the call admission control server, the location of the first computer system from the network subnet for the first computer system;

deriving, at the call admission control server, the location of the second computer system from the network subnet for the second computer system;

identifying, at the call admission control server, a list of links between the first location and the second location, each link in the list of links having an available bandwidth for media sessions of the specified media type, wherein the available bandwidth in the list is maintained per media type;

determining, at the call admission control server, if the requested media session can be admitted by comparing bandwidth requirements for the requested media session to the available bandwidth for each identified link; and at the call admission control server, sending a decision to the first computer system indicating whether the media session should be admitted or not.

2. The method as recited in claim 1, wherein the first pair of electronic addresses including a host electronic address for the first computer system and a public network electronic address for the first computer system comprise a first pair of Internet Protocol (IP) addresses including a host IP address for the first computer system and an Internet IP address for the first computer system.

3. The method as recited in claim 2, wherein determining a network subnet for the first computer system from a first pair of electronic addresses corresponding to the first computer system comprises determining an IP subnet for the first computer system from the host IP address for the first computer system and the Internet IP address for the first computer system; and wherein deriving the location of the first computer system from the network subnet for the first computer system comprises using the IP subnet for the first computer system to derive a geographic location for the first computer system.

4. The method as recited in claim 2, wherein receiving a session admission request for a decision whether to admit a media session that has been requested between the first computer system and the second computer system comprises receiving a session admission request for a decision whether to admit an audio session.

5. The method as recited in claim 1, wherein the location of the first computer system comprises deriving one or more of: a building, a city, a county, a state, a province, a country, or a continent.

6. The method as recited in claim 1, further comprising sending a request for link information to a link database, the request for link information for links in a path between the first location and second location, the link database including a plurality of entries indicating available bandwidth on links between specified endpoints.

7. The method as recited in claim 6, wherein accessing a list of identified links between the first location and the second location comprises receiving a list of links from the link database.

8. The method as recited in claim 7, wherein determining if there is sufficient bandwidth available between the first and second locations comprises determining if there is sufficient bandwidth available between the first and second locations by comparing bandwidth requirements to link information in links received from the link database.

9. The method as recited in claim 1, wherein determining if there is sufficient bandwidth available between the first and second locations comprises determining that at least one link between the first and second location lacks sufficient bandwidth for the media session; and wherein deciding whether or not to admit the media based session based on the determination comprises denying the session based on the at least one link lacking sufficient bandwidth for the media session.

10. The method as recited in claim 1, wherein determining if there is sufficient bandwidth available between the first and second locations comprises determining that each link between the first and second location has sufficient bandwidth for the media session; and wherein deciding whether or not to admit the media based session based on the determination comprises admitting the session based on each link having sufficient bandwidth for the media session.

11. A computer program product for use at a call admission control server, the call admission control server residing in a common site with one or more computer systems, including a first computer system, the computer system connected to a further one or more other computer systems, including a second computer system, via a wide area network, the computer program product for implementing a method for making a call admission control policy decision for a establishment of a media session requested between the first computer system and the second computer system, the computer program product comprising one or more computer storage devices having stored thereon computer-executable instructions that, when executed by a processor, cause the computer system to perform the method, including the following:

receive from the first computer system a policy decision request for a decision whether to admit a media session that has been requested between the first computer system and the second computer system, the policy decision request including:

a first pair of electronic addresses, the first pair of electronic addresses including a host electronic address for the first computer system and a public network electronic address for the first computer system, the public network electronic address routable from anywhere on the Internet;

a second pair of electronic addresses, the second pair of electronic addresses including a host electronic address for the second computer system and a public network electronic address for the second computer system, the public network electronic address routable from anywhere on the Internet;

a specified media type for the media session; and bandwidth requirements for the media session; and wherein the policy decision request is received from the first computer system in response to the first computer system receiving a session admission request from the second computer system, wherein the session admission request comprises the first pair of electronic addresses, a specified media type for the media session, and bandwidth requirements for the media session; and wherein the policy decision request is a reformulated version of the session admission request, reformulated to also include the second pair of electronic addresses;

derive a first location from the first pair of electronic addresses, the first location being the location of the first computer system;

derive a second location from the second pair of electronic addresses, the second location being the location of the second computer system;

access a list of identified links between the first location and the second location, each link in the list of links having an available bandwidth for media sessions of the specified media type, wherein the available bandwidth in the list is maintained per media type;

determine if there is sufficient bandwidth available between the first and second locations by comparing the bandwidth requirements for the requested media session to the available bandwidth for each identified link; and sending a decision to the first computer system indicating whether the media session should be admitted or not.

12. The computer program product as recited in claim 11, wherein computer-executable instructions that, when executed, cause the computer system to receive a policy decision request for a decision whether to admit a media session comprises computer-executable instructions that, when executed, cause the computer system to receiving a policy decision request for a decision whether to admit a session for one or more of audio data or video data.

13. The computer program product as recited in claim 11, wherein a first pair of electronic addresses including a host electronic address for the first computer system and a public network electronic address for the first computer system comprise a first pair of Internet Protocol (IP) addresses including a host IP address for the first computer system and an Internet IP address for the first computer system.

14. The computer program product as recited in claim 13, wherein computer-executable instructions that, when executed, cause the computer system to derive a first location from the first pair of electronic addresses comprise computer-executable instructions that, when executed, cause the computer system to:

derive an IP subnet for the first computer system from the host IP address for the first computer system and the Internet IP address for the first computer system; and use the IP subnet to derive a geographic location for the first computer system.

15. The computer program product as recited in claim 11, wherein computer-executable instructions that, when executed, cause the computer system to derive a first location from the first pair of electronic addresses comprise computer-executable instructions that, when executed, cause the computer system to derive one or more of: a building, a city, a county, a state, a province, a county, or a continent.

16. The computer program product as recited in claim 11, wherein computer-executable instructions that, when executed, cause the computer system to determine if there is sufficient bandwidth available between the first and second locations comprise computer-executable instructions that, when executed, cause the computer system to determine that at least one link between the first and second location lacks sufficient bandwidth for the media session; and wherein computer-executable instructions that, when executed, cause the computer system to decide whether or not to admit the media based session based on the determination comprises computer-executable instructions that, when executed, cause the computer system to deny the session based on the at least one link lacking sufficient bandwidth for the media session.

17. The method as recited in claim 11, wherein computer-executable instructions that, when executed, cause the computer system to determine if there is sufficient bandwidth available between the first and second locations comprise computer-executable instructions that, when executed, cause the computer system to determine that each link between the first and second location has sufficient bandwidth for the media session; and wherein computer-executable instructions that, when executed, cause the computer system to decide whether or not to admit the media based session based on the determination comprises computer-executable instructions that, when executed, cause the computer system to admit the session based on each link having sufficient bandwidth for the media session.

18. A computer system, the computer system comprising:

one or more processors;

system memory;

one or more computer storage devices having stored thereon computer-executable instructions representing a location determination module and a decision module, wherein the location determination module is configured to:

receive from a first computer system a policy decision request for a decision whether to admit an audio session that has been requested between the first computer system and a second computer system, the policy decision request including:

a first pair of Internet Protocol (IP) addresses, the first pair of IP addresses including a host IP address for the first computer system and a public IP address for the first computer system, the public IP address routable from anywhere on the Internet;

a second pair of IP addresses, the second pair of IP addresses including a host IP address for the second computer system and a public IP address for the second computer system, the public IP address routable from anywhere on the Internet; and bandwidth requirements for the audio session; and wherein the policy decision request is received from the first computer system in response to the first computer system receiving a session admission request from the second computer system, wherein the session admission request comprises the first pair of electronic addresses, a specified media type for the media session, and bandwidth requirements for the media session; and wherein the policy decision request is a reformulated version of the session admission request, reformulated to also include the second pair of electronic addresses;

derive a first geographic location from the first pair of IP addresses, the first location being the geographic location of the first computer system; and derive a second geographic location from the second pair of IP addresses, the second location being the geographic location of the second computer system; and wherein the decision module is configured to:
- access a list of identified links between the first geographic location and the second geographic location, each link in the list of links having an available bandwidth for audio sessions;
- determine if there is sufficient bandwidth available between the first and second geographic locations by comparing the bandwidth requirements for the requested audio session to the available bandwidth for each identified link; and
- sending a decision to the first computer system indicating whether the audio based session should be admitted or not.

19. The computer system as recited in claim 18, further comprising a link database, the link database storing a plurality of entries indicating available bandwidth on links between specified endpoints; and
- wherein the decision module being configured to determine if there is sufficient bandwidth available between the first and second geographic locations comprises the decision module being configured to request entries from the link database, the entries for links in a path between the first geographic location and the second geographic location.

* * * * *